Jan. 1, 1963   C. W. PORTER   3,071,712
CONTROL CIRCUIT
Filed Jan. 15, 1959
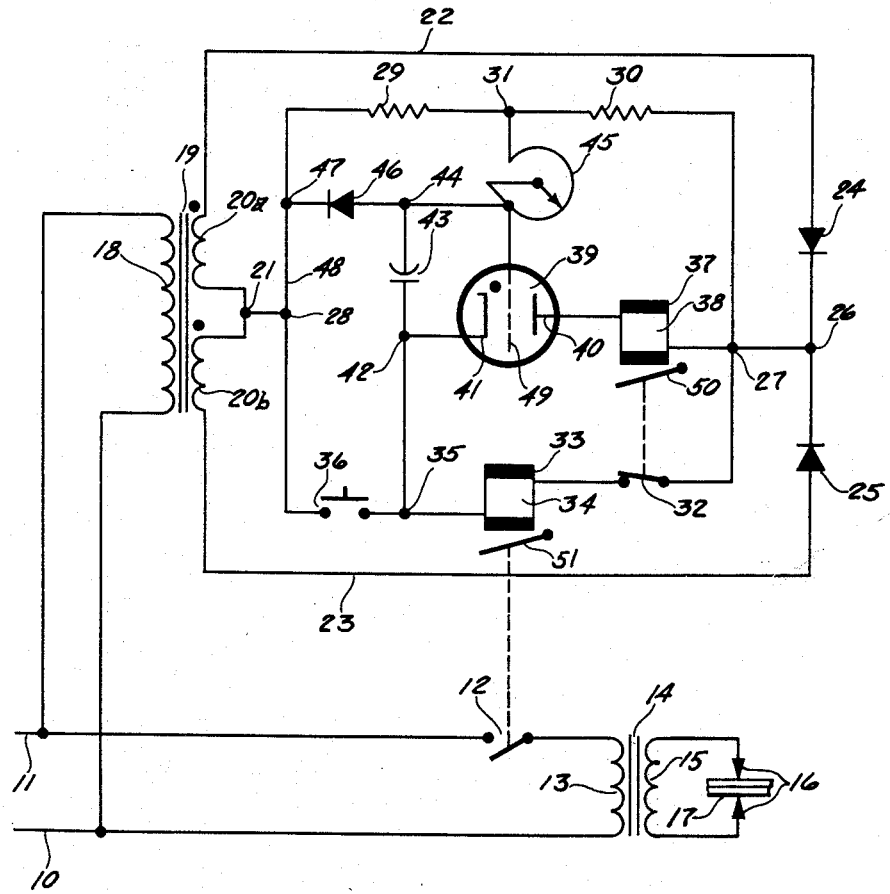
INVENTOR.
CLARENCE W. PORTER
BY

3,071,712
CONTROL CIRCUIT
Clarence W. Porter, Wauwatosa, Wis., assignor to Square
 D Company, Detroit, Mich., a corporation of Michigan
Filed Jan. 15, 1959, Ser. No. 786,940
7 Claims. (Cl. 317—142)

This invention relates to control circuits and is more particularly concerned with a circuit which will provide a control function for a predetermined time interval.

The circuit according to the present invention hereinafter described is particularly suited for controlling the interval of current flow between the electrodes of a welder and is characterized by its simplicity, its low cost and its ability to provide consistent timing periods. Another feature of the timing circuit is that it may be adjusted to provide a minimum weld interval. That is, it will cause weld current flow having a duration of one half cycle of the voltage wave of the alternating current source which supplies welding current to the welding transformer. The above features are accomplished by providing the timer with a timing capacitor which is charged during standby conditions and utilizing the initiating switch of the timer to simultaneously complete an energizing circuit for the welding contactor and a discharge circuit for the capacitor.

It is an object therefore of the present invention to provide a control circuit for a welder which incorporates the above features and advantages.

Another object of the present invention is to provide a timing circuit with a capacitor which is charged during standby and which has its discharge circuit controlled by an initiating switch which also controls the energization of a relay that controls the flow of current in a load circuit.

A further object of the present invention is to provide a timing circuit which includes a normally charged capacitor, a relay which has a pair of contacts in a load circuit and an actuating coil in series circuit with the contacts of a second relay which has an actuating coil in circuit with a means such as an electronic tube which is rendered conductive when the capacitor is discharged and a discharge circuit for the capacitor which is controlled by the initiating switch of the device which simultaneously completes an energizing circuit to the electronic tube and second relay and a shunt circuit about the charging circuit for the capacitor.

Further objects and features of the invention will be readily apparent to those skilled in the art from the specification and appended drawing illustrating certain preferred embodiments in which:

The single figure illustrates a preferred embodiment of the present invention wherein the numerals 10 and 11 indicate lead lines which are connected to a suitable source of alternating current and voltage, not shown. The leads 10 and 11 are connected through a switch 12 having a pair of normally open contacts to a primary winding 13 of a welding transformer 14 to supply the winding 13 with alternating current when the switch 12 is closed. The welding transformer 14 has a secondary winding 15 connected to supply a pair of welding electrodes which are diagrammatically shown. Thus, whenever the switch 12 is closed, the transformer 14 will be energized and welding current will pass through the electrodes 16 to weld the material 17 against which the electrodes are pressed in the conventional manner. Connected across the leads 10 and 11 is a primary winding 18 of a supply transformer 19. The transformer 19 has a pair of secondary windings 20a and 20b, each of which have the polarities indicated, and have one end connected to a junction 21. The other end of winding 20a is connected to supply a lead 22 and the other end of winding 20b is connected to supply a lead 23. The leads 22 and 23 are connected through suitable rectifiers 24 and 25 respectively to a junction 26, which in turn is connected to a junction 27. The rectifiers 24 and 25 may be of any suitable well known types. The junction 21 is connected to a junction 28. It is clearly apparent the arrangement of windings 20a and 20b and the rectifiers 24 and 25 respectively, will cause direct current to be impressed across the junctions 27 and 28 with the junction 27 being postive relative to junction 28. Connected across the junctions 27 and 28 is a voltage divider comprising resistors 29 and 30 having a junction 31 located therebetween. Connected in a series circuit between the junctions 27 and 28 is a normally closed switch 32, an actuating coil 33 of a relay 34, a junction 35, and a normally opened initiating switch 36. Also connected between junctions 27 and 35 and responsive to the control of switch 36 is a series circuit comprising an actuating coil 37 of a relay 38, the main electrodes of an electronic tube 39 and a junction 42. The tube 39, which preferably is of the gas filled type, such as a thyratron, has its anode 40 connected to the coil 37 and its cathode connected to the junction 42. A timing capacitor 43 has one of its plates connected through a series circuit including a junction 44 and a potentiometer resistor 45 to the junction 31. The other plate of the capacitor 43 is connected to the junction 42. A rectifying diode 46 is connected between the junction 44 and a junction 47 which in turn is connected by a lead 48 to junction 28. The grid 49 of the tube 39 is connected to the junction 44 side of the capacitor 43 while the cathode 41 is connected to the junction 42 side of the capacitor 43. The relay 38 has an armature 50 mechanically connected to switch 32, as shown by the dotted line. The switch 32 will be opened whenever the actuating coil 37 is energized. The relay 34 is provided with an armature 51 which is mechanically connected to switch 12 to close the switch 12 whenever the actuating coil 33 of relay 34 is energized. The connection between armature 51 and switch 12 is also shown by dotted lines.

It is to be appreciated that the circuit may also include filter capacitors, grid load resistors, and cathode heaters, which are not shown, the inclusion of which will be readily apparent to those skilled in the art.

With the above parts in mind, the operation of the circuit will now be explained.

During standby conditions, that is, before the switch 36 is closed, the alternating current in the primary winding 18 will energize the secondary windings 20a and 20b, causing a direct current potential to be impressed across junctions 27 and 28. This direct current potential will charge capacitor 43 through a charging circuit which includes the series connected circuit junction 27, normally closed switch 32, actuating coil 33, junction 35 and junction 42, capacitor 43, junction 44, rectifier 46, junction 47 and junction 28. It is clearly apparent that the current flow in this circuit will cause the capacitor 43 to be charged with the junction 42 side positive and the junction 44 side thereof negative without energizing relay 34 because of the small capacity of the capacitor. The charge on capacitor 43 will be impressed between the cathode 41 and grid 49 of tube 39 to maintain the tube 39 nonconducting.

When the initiating switch 36 is closed, direct current will immediately flow from the windings 20a and 20b through the actuating coil 33 through a circuit which includes lead 23, rectifier 25, and junction 26 or through lead 22, rectifier 24 to junction 26 to junction 27, the normally closed switch 32, the actuating coil 33, the junction 35 and the now closed initiating switch 36 to junction 28 from whence it is returned to the junction 21. When the actuating coil 33 is energized, the armature 51 will cause switch 12 to close to begin the flow of welding current through electrodes 16. The closure of the initiating switch 36 will also cause a discharge circuit for the capacitor to be established. This circuit includes the junction 42, the junction 35, the now closed switch 36, the junction 28, the junction 47, the voltage dividing resistor 29, the junction 31, the potentiometer resistor 45 and junction 44. In this connection it is to be noted the rectifier 46 will prevent the initiating switch 36 from short circuiting the capacitor 43 upon closure of switch 36. The closing of the initiating switch 36 will also cause the junctions 35 and 47 to be substantially at the same potential. Thus the charging circuit for the capacitor 43 is effectively shunted. The closed initiating switch 36 will also establish the circuit which includes the junction 27, the actuating coil 37, the anode 40 to cathode 41 to junction 42 to render the tube 39 in condition for conduction as soon as the capacitor 43 is sufficiently discharged. If the potentiometer 45 is set to a minimum value and the value of resistor 29 is properly chosen, the discharge of capacitor 43 will occur within a one-half cycle after the initiating switch was closed. The tube 39 thus will conduct on the succeeding one-half cycle after the initiating switch is closed to complete the energizing circuit to the actuating coil 37 of relay 38. The relay 38 when energized will attract armature 50 and cause the normally closed switch 32 to open to interrupt the circuit to the actuating coil 33. In this connection, the relays 34 and 38 are preferably selected to have the same characteristics, that is, they will each have the same delay in responding to the energization of their respective coils. Thus, if the initiating switch completes the energization circuit to the relay 34 in one half cycle of the alternating current supply and the tube 39 causes the relay 38 to be energized during the succeeding half cycle, then only a half cycle of welding current will flow in the welding transformer 14. Further, it is to be appreciated that while in the drawings the switch 12 is used to directly control the flow of current in the primary winding 13 of the welding transformer 14, other more complicated and well known systems might be employed. For example, the relay 34 might be used to control an ignitron contactor or a mechanical contactor both of which are well known in the art. Another feature of the circuit according to the present invention is that as long as the initiating switch 36 is held closed, the circuit to tube 39 and relay 38 will be complete to cause the relay 34 to be deenergized as previously set forth. The opening of the initiating switch 36 will cause the system to immediately return to standby conditions.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. The combination comprising; a current source, a first circuit connected across the source, said first circuit including; a grid controlled electronic tube having a pair of main electrodes connected in series with an actuating coil of a first relay having a pair of normally closed switch contacts movable to an open circuit position whenever the coil is energized, a second circuit connected across the source including the contacts of the first relay and an actuating coil of a second relay, a timing capacitor connected to the grid of the electronic tube for controlling the conduction of the electronic tube, a circuit for charging the capacitor with direct current from the source including the actuating coil of the second relay and the contacts of the first relay with a polarity for maintaining the tube nonconducting when the capacitor is charged, a third circuit providing a time rate discharge circuit for the capacitor, and an initiating switch having a pair of normally open switch contacts in the first, the second and the third circuits arranged for simultaneously closing the first, the second and the third circuits when the initiating switch is closed.

2. A timing device, comprising; a source of alternating current, a first relay having an actuating coil arranged for closing a pair of normally open switch contacts in a load circuit, a second relay having an actuating coil arranged for opening a pair of normally closed switch contacts which are connected in a series circuit with the coil of the first relay, a timing capacitor connected in the series circuit to be charged with direct current from the source, means responsive to the charge on the capacitor and connected in a series circuit with the actuating coil of the second relay and the source for completing a circuit to the actuating coil of the second relay when the capacitor is discharged, a time rate discharge circuit for the capacitor and an initiating switch having contacts in the first mentioned series circuit and with the discharge circuit for simultaneously energizing the actuating coil of the first relay and initiating the discharge of the capacitor.

3. In a timing circuit for a welder, the combination comprising; a weld relay having a pair of normally open switch contacts and an actuating coil arranged for closing the contacts when the actuating coil is energized, said contacts being included in a circuit for controlling current flow through the primary winding of a welding transformer, a source of current connected in a circuit for energizing the actuating coil, a chargeable timing capacitor, a circuit for charging the capacitor with direct current from the source including the actuating coil of the weld relay, a time rate discharge circuit for the capacitor, means including an electronic tube having a control electrode connected to be responsive to the charge on the capacitor and a pair of principal electrodes connected in a circuit with a second relay so as to be energized by the source, the second relay having normally closed contacts arranged for opening the circuit from the source to the actuating coil of the weld relay when the capacitor is discharged, and an initiating switch having a pair of normally open switch contacts in the discharge circuit and in the energizing circuit for the weld relay coil whereby the capacitor begins a time rate discharge simultaneously with the energization of the weld relay.

4. The combination as recited in claim 3 wherein the electronic tube has its main electrodes connected in series circuit with the initiating switch whereby the electronic tube when energized will remain energized as long as the initiating switch is closed.

5. The combination as recited in claim 3 wherein the source provides an alternating current voltage wave and the weld relay and electronic tube are energized through the same full wave rectifier from the source whereby the weld relay may be closed for a minimum of a half cycle of the voltage wave of the source.

6. The combination as recited in claim 3 wherein the time rate discharge circuit is variable and the capacitor is charged with direct current from the source to a potential across a portion of a voltage divider which is connected across the source and which portion provides a portion of the time rate discharge circuit.

7. A timing control comprising a source of direct current, a first electromagnetic relay having normally closed contacts and an operating coil, a second electromagnetic relay having contacts in a work circuit and an operating coil, a grid-controlled electronic tube, a timing capacitor, a normally open initiating switch, means connecting the contacts of the first relay and the coil of the second relay in a first series circuit and connecting the first series circuit in series with the initiating switch across the source, means connecting the coil of the first relay and the principal electrodes of the electronic tube in series with each other in a second series circuit and the second series circuit in series with the initiating switch and in parallel with the first series circuit, means connecting the capacitor to a pair of the electrodes of the electronic tube so that the charge thereon controls the conductivity of the tube, a charging circuit for the capacitor normally completed across the source through the first series circuit, the charging current of the capacitor being below the pick-up value of the second relay, and a discharge circuit for the capacitor including the initiating switch, whereby upon closure of the initiating switch the discharge circuit for the capacitor is completed and the two series circuits are connected across the source simultaneously.

References Cited in the file of this patent

UNITED STATES PATENTS

| | | |
|---|---|---|
| 2,008,413 | Dawson | July 16, 1935 |
| 2,366,060 | Schneider | Dec. 26, 1944 |
| 2,597,347 | Lommen | May 20, 1952 |
| 2,785,346 | Large | Mar. 12, 1957 |
| 2,790,115 | Elliot | Apr. 23, 1957 |
| 2,818,532 | Aitel | Dec. 31, 1957 |
| 2,831,111 | Bivens | Apr. 15, 1958 |
| 2,942,151 | Large | June 21, 1960 |
| 2,950,422 | Purkhiser | Aug. 23, 1960 |